July 18, 1939.　　S. E. CRESSEY　　2,166,463

FLOAT FOR FISH NETS

Filed Nov. 24, 1936

INVENTOR.

Steve Earl Cressey

BY Lyon & Lyon

ATTORNEYS

Patented July 18, 1939

2,166,463

UNITED STATES PATENT OFFICE 2,166,463

FLOAT FOR FISH NETS

Steve Earl Cressey, San Pedro, Calif.

Application November 24, 1936, Serial No. 112,537

2 Claims. (Cl. 43—50)

This invention relates to floats, such as are used for supporting fish nets or the like in the water.

Such nets are usually supported on floats of cork, and it is usual to give them a cylindrical form with a central eye, enabling as many floats as desired to be strung together on a short line or cord, the ends of which are secured to the upper rope or line of the net. The frequent wetting and drying of the cork floats and the wear upon them by chafing of the line through them tends to disintegrate them. Furthermore, when such floats become thoroughly soaked with water their buoyancy may become considerably reduced.

The general object of this invention is to produce a float for this purpose which will have great buoyancy and which will be durable and serviceable when in use. Also to provide a float the interior of which will be protected from the injurious action of the water in which the float is used.

Further objects of the invention will appear hereinafter.

The invention consists in the novel parts and combinations of parts to be described hereinafter, all of which contribute to produce an efficient float for fish nets.

Referring particularly to the parts, 1, 1, illustrates the individual floats of a gang of floats attached by a line 2 to the upper rope or line 3 of a net 4. Such floats are usually provided with a central eye or opening through which the line or cord 2 is threaded.

Figure 1:
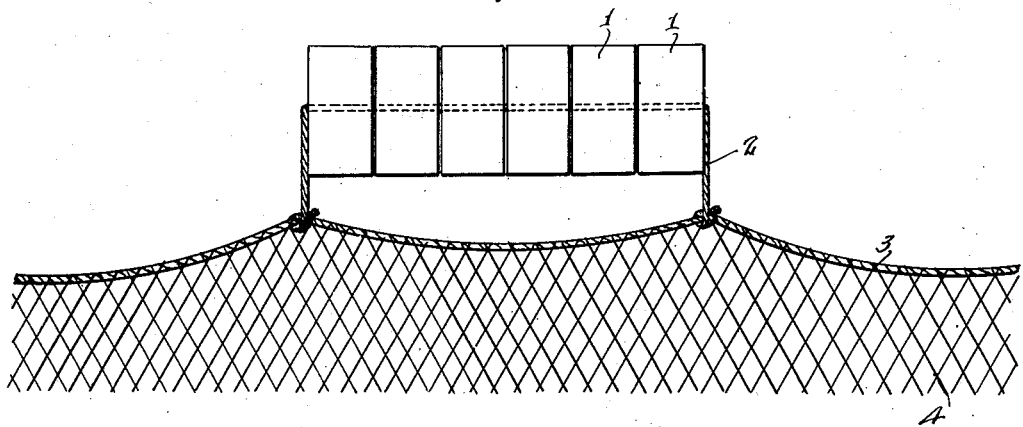
Figure 1 is a side elevation, illustrating a multiple float embodying my invention, and illustrating a portion of a fish net which the float is intended to support in the water.
Figure 2:
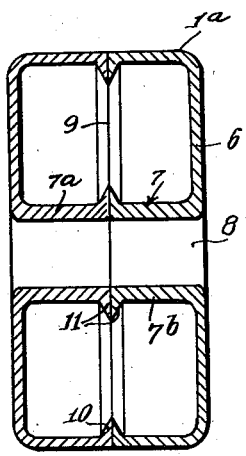
Fig. 2 is a longitudinal section through a single float or unit upon an enlarged scale and illustrating one embodiment of my invention.

In the embodiment illustrated in Fig. 2 the float 1a preferably consists of a cylindrical shell composed of a waterproof material, such as rubber, and formed with integral heads 6.

The heads 6 are connected by a sleeve 7 preferably integral with the heads 6, and forming a central eye 8 through the float for the passage of the line 2.

In practice, I prefer to make the float 1a in two sections or halves of rubber molded in the shape shown and joined together by vulcanizing the ends 9 of the shell walls together. In order to facilitate this the ends of the cylindrical outer walls of the two sections are preferably thickened by providing internal flanges 10 that substantially increase the area of the abutting vulcanized surfaces, and these flanges also stiffen the body of the float in its medial plane. The abutting ends of the sleeve sections 7a and 7b are also preferably provided with flanges 11 for the same general purpose.

In this way a float is formed with a watertight wall and having superior buoyancy which will be maintained so long as the wall of the float continues intact.

The flat heads 6 of the floats are most advantageous when the floats are strung together on the line 2, because these heads abut against each other and assist in keeping the floats in axial alignment with each other, and the abutting heads brace each other at their points of junction to the cylindrical walls of the floats. In this way the cylindrical walls are braced against collapse, and such collapsing is also resisted considerably on account of the angular form of cross-section of the material where the heads join the cylindrical walls (see Fig. 2).

It will be evident that in both embodiments of my invention the buoyancy of the float will be maintained unimpaired throughout the life of the float. The float is durable and not materially affected by becoming repeatedly wet and dry.

What I claim is:

1. A float for a net, adapted to be strung onto a line with a plurality of similar floats, said float consisting of a pair of substantially cylindrical shells of rubber, each shell having a substantially flat head with a substantially cylindrical outer wall and a central tubular sleeve, the said cylindrical walls and the ends of the said cylindrical sleeves abutting against each other and being vulcanized together.

2. A float for a net, adapted to be strung onto a line with a plurality of similar floats, said float consisting of a pair of substantially cylindrical shells of rubber, each shell having a substantially flat head with a substantially cylindrical outer wall integral therewith and uniting with the same so that an angle is formed between the cylindrical wall and the head, each shell further having a central tubular sleeve, the ends of said cylindrical walls and the ends of said sleeves having inwardly projecting flanges, said flanges abutting against each other respectively, and being vulcanized together.

STEVE EARL CRESSEY.